H. P. WELLMAN.
NUMERATING AND RECORDING MACHINE.
APPLICATION FILED NOV. 7, 1914.
1,214,399.
Patented Jan. 30, 1917.
6 SHEETS—SHEET 4.
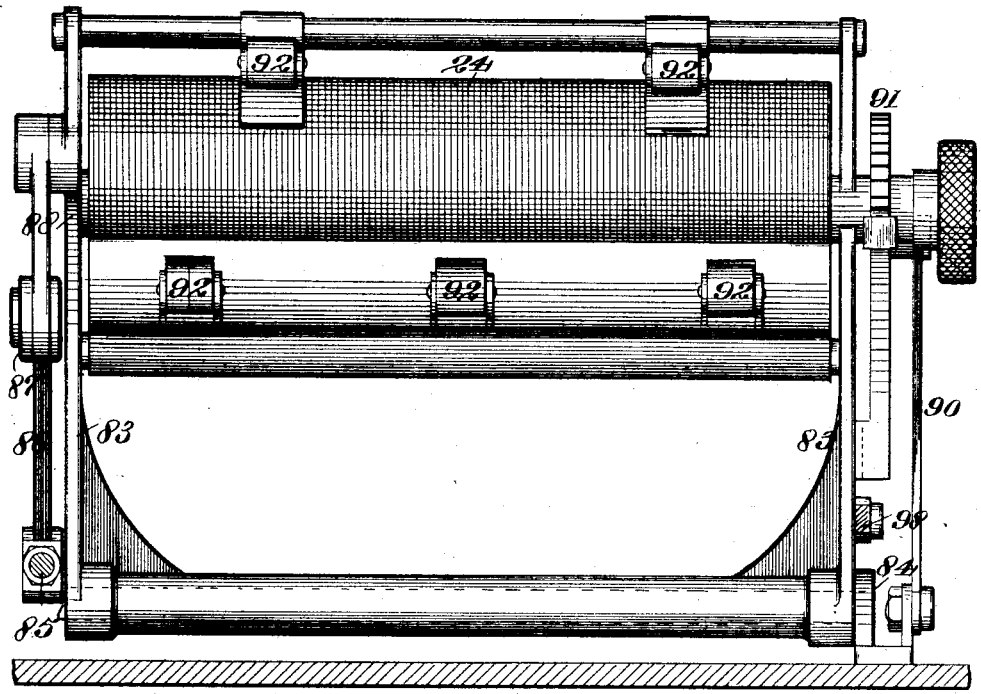
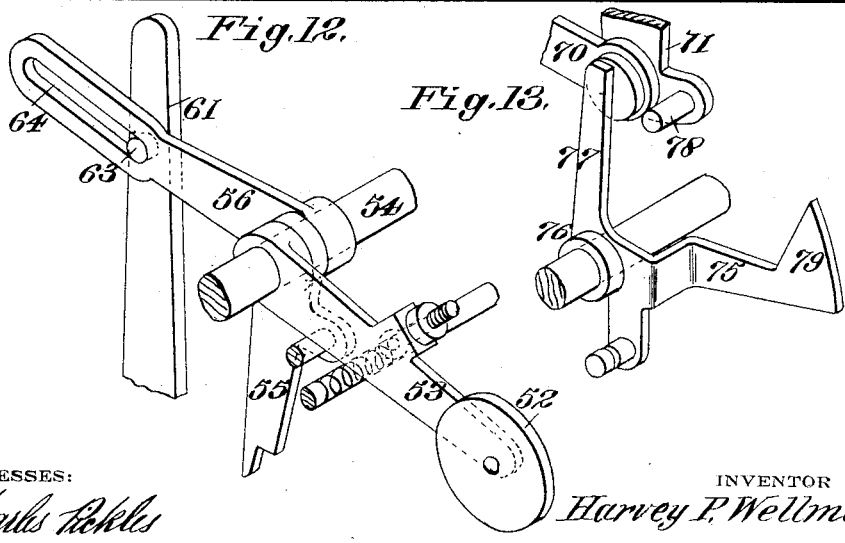
WITNESSES:
INVENTOR
Harvey P. Wellman,
BY G. H. Strong
ATTORNEY H. P. WELLMAN.
NUMERATING AND RECORDING MACHINE.
APPLICATION FILED NOV. 7, 1914.
1,214,399.
Patented Jan. 30, 1917.
6 SHEETS—SHEET 5.
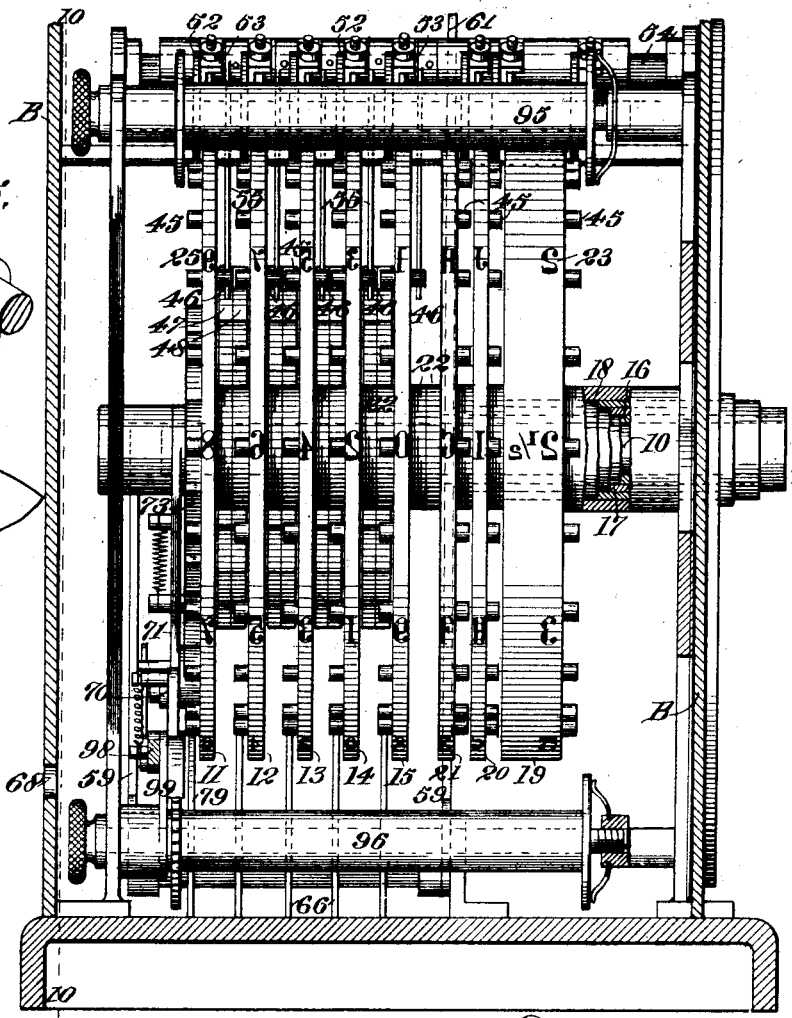
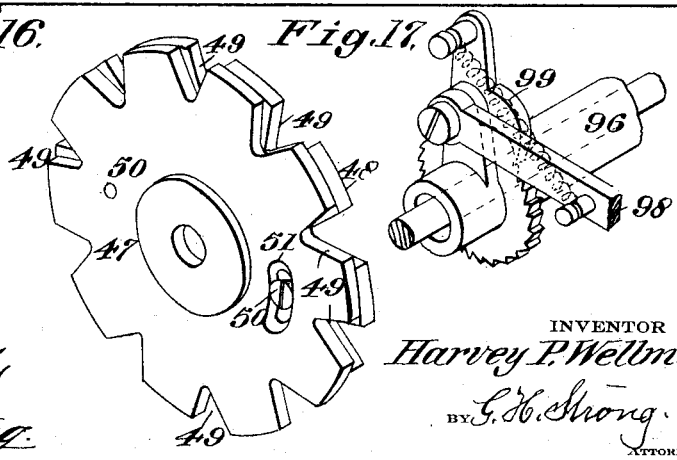
WITNESSES:
Charles Pickles
Thos Castberg
INVENTOR
Harvey P. Wellman,
BY G. H. Strong
ATTORNEY

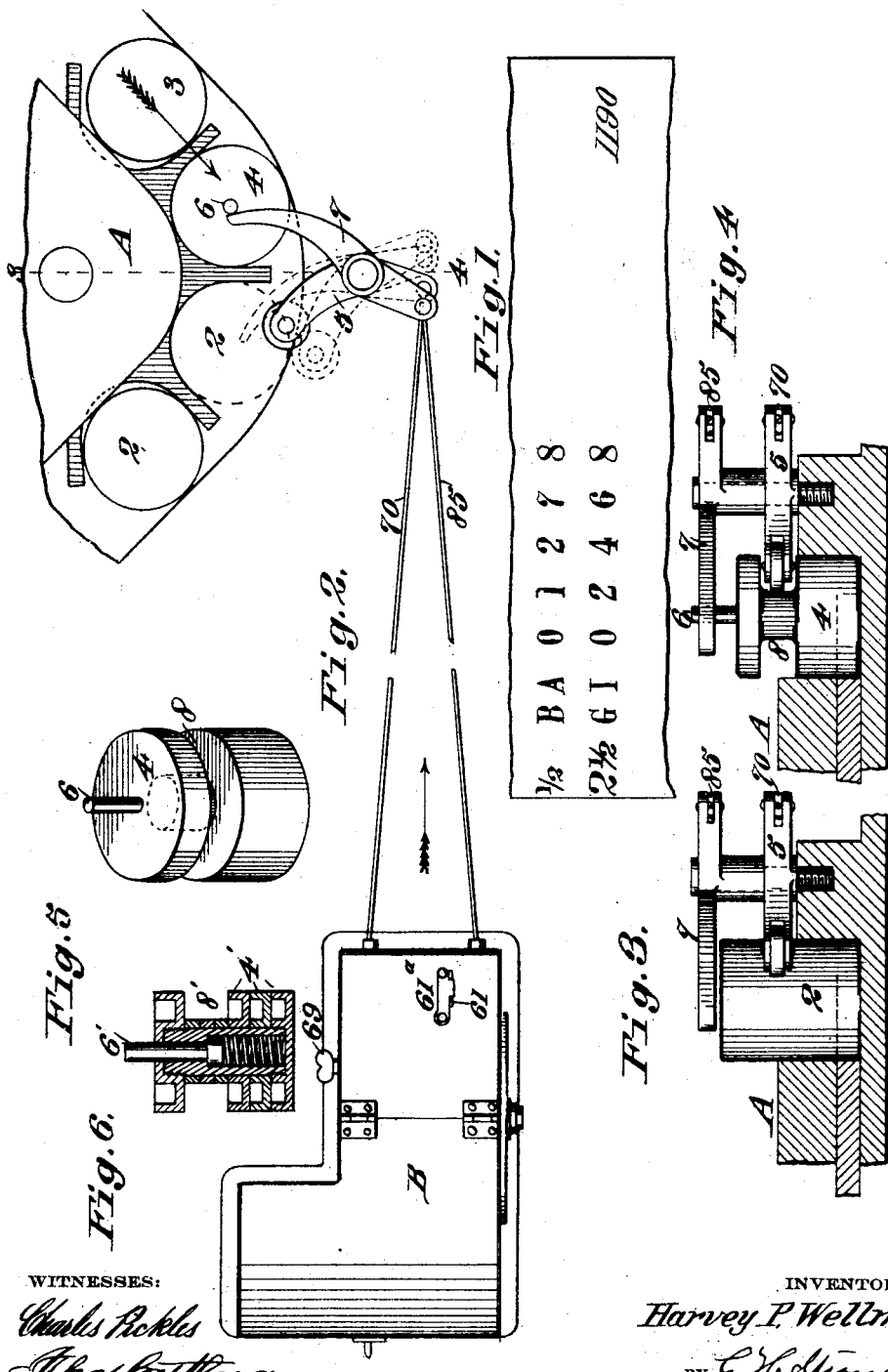

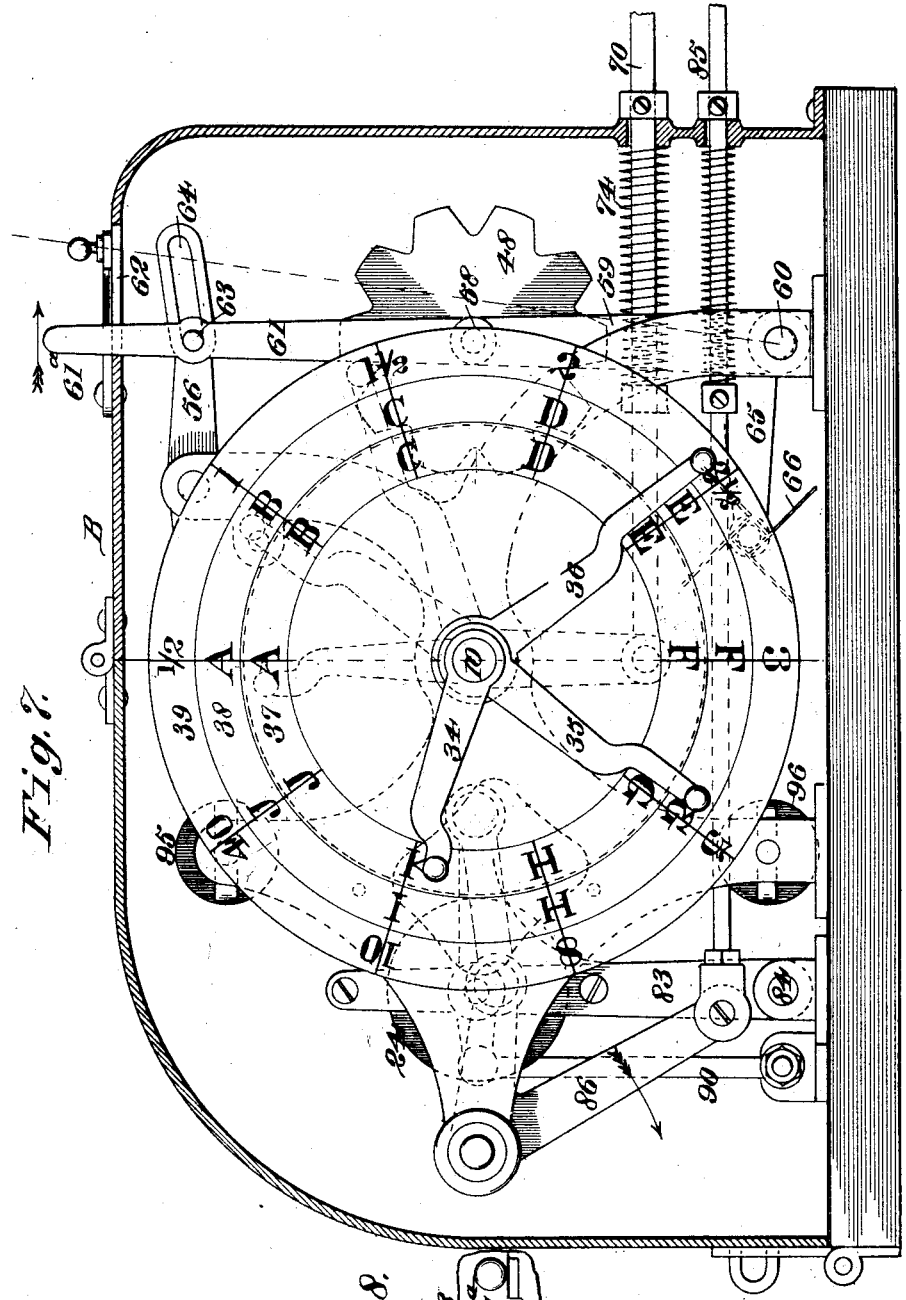

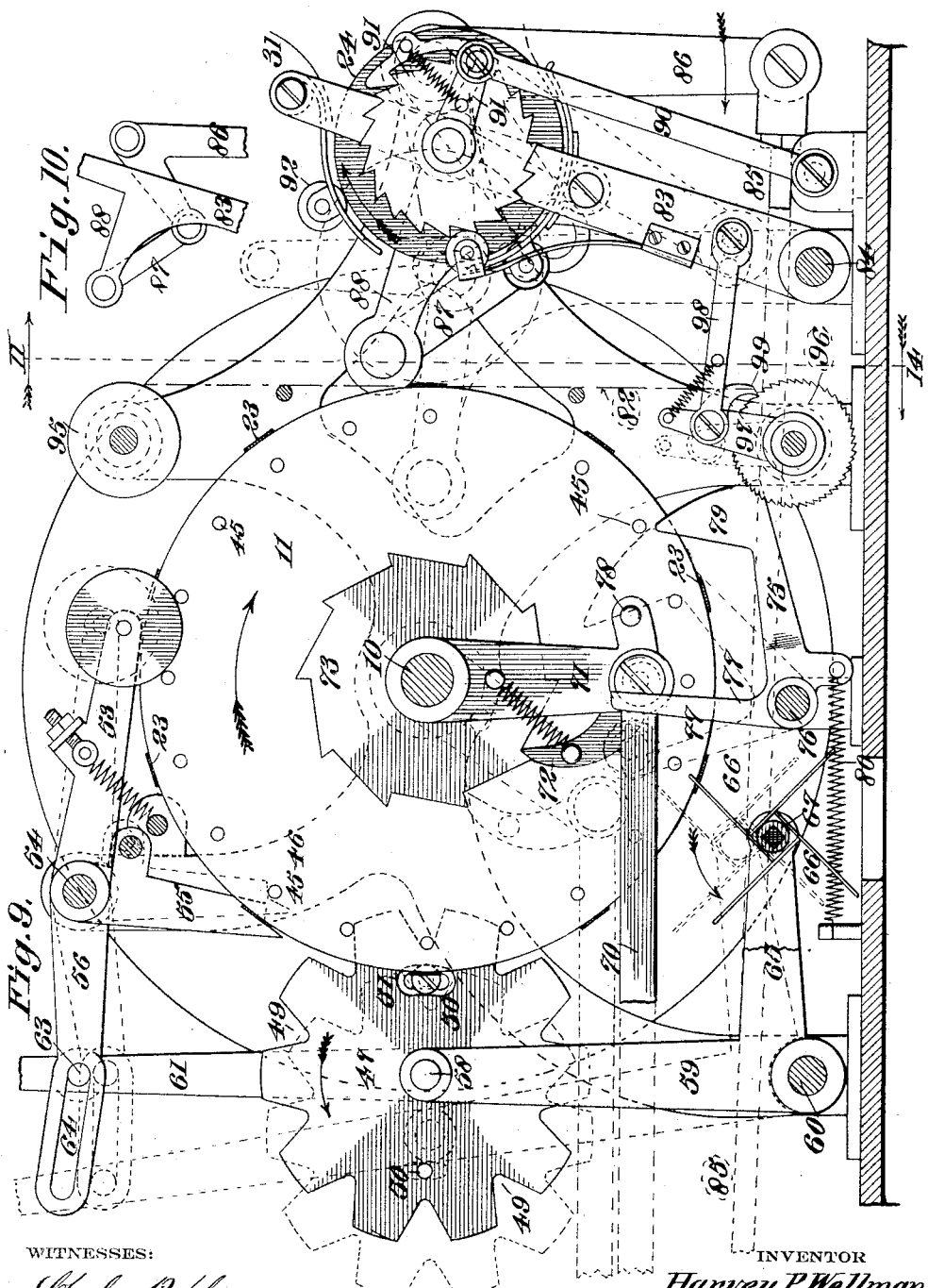

H. P. WELLMAN.
NUMERATING AND RECORDING MACHINE.
APPLICATION FILED NOV. 7, 1914.

1,214,399.

Patented Jan. 30, 1917.
6 SHEETS—SHEET 6.

WITNESSES:
Charles Pickles
Thos Castberg

INVENTOR
Harvey P. Wellman
BY G. H. Strong.
ATTORNEY

UNITED STATES PATENT OFFICE.

HARVEY P. WELLMAN, OF OAKLAND, CALIFORNIA.

NUMERATING AND RECORDING MACHINE.

1,214,399.  Specification of Letters Patent.  Patented Jan. 30, 1917.

Application filed November 7, 1914. Serial No. 870,791.

*To all whom it may concern:*

Be it known that I, HARVEY P. WELLMAN, a citizen of the United States, residing at Oakland, in the county of Alameda and State of California, have invented new and useful Improvements in Numerating and Recording Machines, of which the following is a specification.

This invention relates to a machine for counting various articles as they pass a given point, and for making an accurate record as to their character, number, size, quality, etc., and pertains especially to a machine for counting and making a record of cans in fruit packing establishments and elsewhere.

Canned goods in the course of packing or being made up in the factory and before they are labeled are indistinguishable one class from another, and one can from another, and it has heretofore been a source of a great deal of difficulty and confusion to keep track of the hundreds of different varieties and different grades of goods packed, and different grades and weights of syrup used in making up the contents day by day. In view of this difficulty and the demand for a machine which will to a large degree automatically count and record not only the individual articles handled, but the various grades, weights and qualities of articles, I have devised the mechanism hereinafter described.

The invention consists of the parts and the combination and construction of parts as hereinafter more fully described and claimed, having reference to the accompanying drawings, in which—

Figure 18:
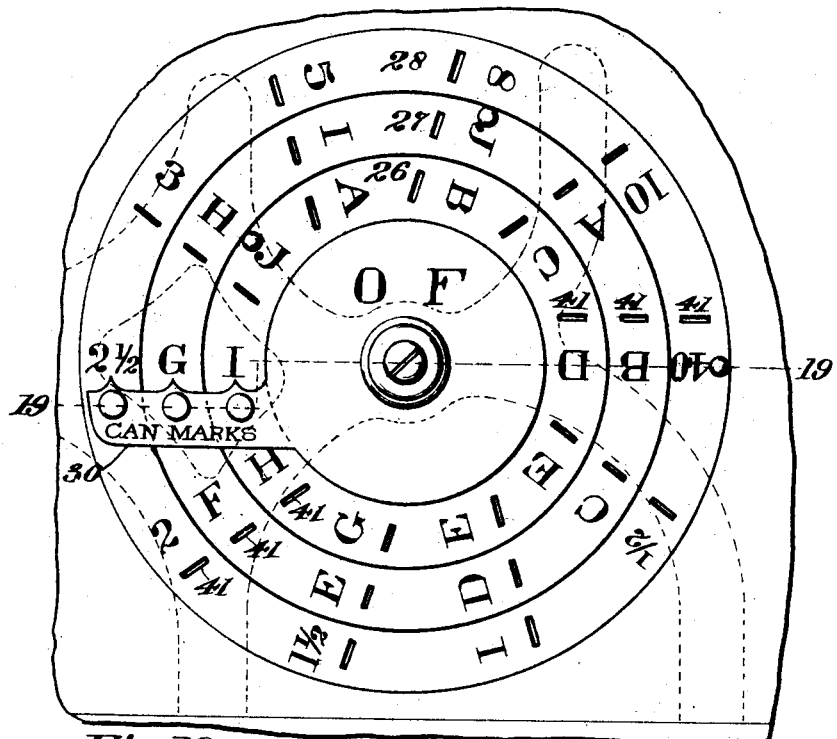
Figure 19:
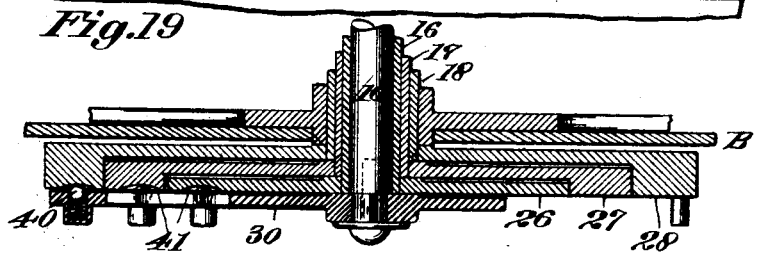

Figure 1 is a detail view of a finished record. Fig. 2 is a plan view of the recording device and means of operation. Figs. 3 and 4 are cross sections on line 3—4, Fig. 2, showing passing can and passing of dummy can. Fig. 5 is a perspective view of a dummy can. Fig. 6 is a section of an adjustable dummy can. Fig. 7 is a side elevation of the recording machine with case in section. Fig. 8 is a detail plan view of clearance lever detent on case. Fig. 9 is a vertical longitudinal section on line 10—10 Fig. 14. Fig. 10 is a detail view of the printing mechanism operating levers. Fig. 11 is a vertical transverse section on line 11—14 Fig. 9, looking in direction of arrow 11. Fig. 12 is a detail perspective view of the clearing operating mechanism. Fig. 13 is a detail perspective view of the numeral wheel detent device. Fig. 14 is a vertical transverse section on line 11—14, Fig. 9, looking in the direction of arrow 14. Fig. 15 is a detail perspective view of the clearing dogs. Fig. 16 is a perspective view of the carrying wheels. Fig. 17 is detail perspective view of the ribbon reeling mechanism. Fig. 18 is a detail elevation of the index disks. Fig. 19 is a horizontal section on line 19—19 of Fig. 18.

It will be manifest that while I have shown and described the invention in its particular adaptation to the fruit canning industry, the apparatus is applicable to a great variety of uses.

The invention comprises generally coördinated counting and printing mechanisms arranged to be operated at the will of the attendant by the cans or special tokens passing out of the sealing machine, or as they pass any given point in the operation of packing; it being desirable that this point be near the last operation in the sealing or packing machine.

Referring to Fig. 2, A represents the packing machine, can carrier or other source of supply for the cans which are to be counted, and B a case situated at any suitable point more or less remote from the cans, and containing the counting, classifying and recording mechanism hereinafter to be described. 2—2 represent counted cans; 3 a yet unrecorded can and 4 a dummy can or token for operating the marking or printing mechanism, as hereinafter described. The cans 2 as they progress in their travel operate the count mechanism trigger 5, see especially Figs. 2 and 3, while the dummy can 4, Figs. 2–4 has an upwardly projecting pin 6 adapted to engage the marking mechanism trigger 7 placed in the plane above the level of the top of a can as shown in Fig. 3; the dummy can 4 having a peripheral groove 8 which permits it to clear the counting trigger 5. It is understood that the dummy can 4 is only sent through the machine at the end of a run of a certain size, variety, grade or quality of article being packed.

*Counting and classifying mechanism.*—A machine of this nature being subjected to trying conditions in the factory due to temperature changes and moisture in the atmosphere, etc., must be simple and substantially built, avoiding as far as possible the use of small springs, and unnecessary cumbering devices. It is also important that a recording mechanism of this sort be so constructed as to be rendered adjustable to prevent either under-carrying or over-carrying.

Referring to Figs. 14 and 9, 10 represents a stationary shaft journaled in casing B and forming an axis for the train of count wheels 11—12—13—14—15, and for the concentric shafts 16—17 and 18, which carry the respective can marking wheels 19—20 and 21; all these several wheels being suitably spaced from each other and from the wall of casing B by suitable spacing washers 22. The marking wheels 19—20—21 with their hollow shafts and the count wheels 11—12—13—14—15 are all free to turn on the central stationary shaft 10; the count wheels 11—12—13—14 and 15 constituting a group by themselves and the marking wheels 19—20—21 constituting a group by themselves and yet all of the wheels at the proper time operating as marking wheels since each and all of these wheels are provided with type face 23 on their periphery adapted to coöperate with a platen roll 24 and suitable inking mechanism, all in the manner hereinafter to be described.

The marking wheels 19—20—21 (so-called because by them the appropriate can marks such as weight, variety and grade are indicated) are actuated from the outside of the machine, while the counting wheels proper, 11 to 15 inclusive, are operated in train from the counting trigger 5, as will be shortly explained. I have shown two modes of actuating the marking wheels 19—20—21: In Figs. 18 and 19 there is shown the preferred method in which the hollow shafts 16—17—18 connect with respective indicator dials 26—27—28 on the outside of the casing B. These dials are provided with suitable markings according to the variety and nature of the goods handled. The outside dial 28 is marked to indicate size or weight; the next adjacent dial 27 may be marked to indicate the variety of goods packed, one letter standing say for peaches, another letter standing for example for apricots, and so on; and the inner dial 26 marked to indicate grade or quality, or goods known under some special brand or mark. These three dials 26—27—28 are each independently movable with relation to a fixed indicator or pointer 30. The operator brings these dials opposite the pointer according to the run through the machine, and the lettering or figures appearing opposite the pointer 30 are duplicated by the type face on the marking wheels 19—20—21 at a point directly opposite the platen roller 24 so that whenever the printing trigger 7 is actuated by a dummy can there will be printed a record on a paper strip 31 which will show the total number of cans of that particular run of goods of that particular variety, weight and grade or quality.

In Figs. 7 and 14 I have shown an alternative method of operating the marking wheels 19—20—21 wherein the hollow shafts 16—17—18 extend to different distances outside the casing and carry indicator fingers 34—35—36, which move over corresponding dials 37—38—39; the only difference between the design of Fig. 7 and that of Fig. 18 being that in one case there are three movable pointers operating over three fixed dials and in the other case there are three movable dials movable with respect to one fixed pointer. The dials in Figs. 18 and 19 are maintained in place by suitable friction devices as the spring-pressed balls 40 seated in the pointer 30 engageable in depressions 41 in the dials.

Each of the denominational count wheels 11—12—13—14—15 is loose on the shaft 10 and is provided on one side with an annular series of twenty projecting pins or lugs 45; each count wheel having on its opposite side a single pin or lug 46. Between the respective pairs of count wheels 11—12, 12—13, 13—14, 14—15, is a carrying or transfer wheel which is made in two complementary, symmetrical parts 47—48 divided in a plane at right angles to its axis. The parts or wheel sections 47—48 are similarly notched with V-shaped notches 49; there being ten of these notches. Each wheel section 47—48 is circumferentially adjustable with relation to each other so as to change the pitch of either wall of the several notches by suitable means as the set screws 50 in one section fitting a corresponding segmental slot 51 in the other section. The object of the two-part wheel construction with its adjustable notches is to prevent under-carrying or over-carrying, and other errors in adding. The reason for this construction will be further apparent when it is understood that one section as 47, is adapted to be operated one step at a time by one of the single pins 46, while the other section of the two-part wheel 47—48 is adapted to be always in mesh with three companion pins 45 on the next succeeding denominational wheel. Thus a double wheel 47—48 will be actuated once with every revolution of the unit wheel 11. This will serve to advance the tens wheel 12 one step, or one-tenth of a revolution, and so on through the train. Making the transfer wheel 47—48 in two parts is an important feature of the invention, because it allows take-up and provision for wear from time to time, without resorting to the crude methods of filing, bending prongs, etc., necessary in other machines.

The count wheels are held in alinement by respective counting wheels 52 each carried on a spring actuated arm 53 fulcruming loose on a rock shaft 54. Rock shaft 54 carries the fixed dogs 55 which on occasion of clearing the machine are adapted to be interposed in the path of a respective lone pin 46 on a count wheel, but at all other times occupy the full line position of Fig. 9, free from interference with the rotation of the count wheels. Also rigid on rock shaft 54 is a slotted operating lever 56 for moving the dogs 55 into and out of engagement with its respective lone pins or lugs 46, in the manner shortly to be described.

*To clear the machine.*—The carrying wheels 47—48 are freely rotatable on the shaft 58, which latter is mounted on and as part of a rocking frame 59; frame 59 being pivoted on a fulcrum shaft 60 and having an upwardly extending arm 61 at one side projecting through a slot 62 in the top of the casing B forming a lever handle, indicated at the left of Fig. 7. The function of the handle 61 is to move the bank of carrying wheels 47—48 out of register with the corresponding pins 45—46 of the count wheels in order to allow the count wheels to be cleared, or all brought back to zero as is necessary at the beginning of any fresh run. When the lever 54 is rocked to disengage the carrying wheels 47—48 from the count wheels, thus placing the parts in the position indicated in dotted lines at the left of Fig. 9, the count wheels are in position to be cleared and all brought back to zero. To this end lever 61 has a pin 63 engaging a cam slot 64 in the crank lever 56 attached to rock shaft 54. Consequently when the lever 61 is thrown to the extreme left, represented by the dotted line position Fig. 9, the other parts assume the dotted line position shown leaving the count wheels free to rotate in one direction and until all of the count wheels are brought into position with zero facing the platen roll 24; this position being indicated when all the single pins 46 are stopped by the dogs 55. In order to rotate the count wheels to clear them, the rocking frame 59 carries the angular arms 65 in which is journaled the brush or brushes 66. The shaft of these brushes 66 form a key stem 67, adapted when the parts are rocked into dotted line position Fig. 9, to be brought into register with the key hole 68 in the case, and to receive the key 69 by which the brushes may be turned to the left to clear the machine in a manner readily understood. When the parts are thrown back into full line position, and the machine is ready for counting, the brushes 66 are normally out of interference with the count wheels.

*Count wheel actuating means.*—Any appropriate method or means of operating the count wheels from the count wheel trigger 5 may be employed. In the present instance I have shown a mechanical connection in the form of a pull rod 70 leading from the trigger 5 to and through the case B and connected to a rocking lever 71, Fig. 9; lever 71 carrying a spring actuated pawl 72 engaging step fashion a rachet wheel 73 on the units wheel 11. Trigger 5 operates the rod in one direction against the action of a spring 74, Fig. 7. Each actuation of trigger 5 thus turns the count wheel 11 one step; ten steps equaling one revolution and one revolution of wheel 11 acting through the carrying wheels 47—48 to move the tens wheel 12 one step, etc., all as before described.

In addition to the brake or centering roller 52 for regulating the rotation of the count wheels, I employ a positive check and detent in the form of a spring operated L-shaped lever 75, Figs. 9 and 13, pivoted at 76 and having a crank arm 77 extending into the path of a pin 78 on the lever 71. The other arm of lever 75 carries a cam 79 adapted on each forward movement of lever 71 to be interposed between adjacent pins 45 of a respective count wheel; a spring 80 operating to maintain the cam 79 normally out of the path of the pins 45. The peculiar shape of the cam projection 79 insures a true alinement of the count wheels and of their respective type faces 23 on each movement of the count wheel trigger 5.

*Printing and recording mechanism.*—This embodies platen roll 24, the paper strip 31 and the inking ribbon 82, which latter is adapted to traverse the type face 23 when the latter are in opposition to the rocking platen 24. Platen 24 is mounted on a rocking frame 83 fulcrumed at 84 so as alternately to be moved from inoperative full line position Fig. 9, to dotted line printing position when it is desired to make a record on the record sheet 31. Any appropriate means of connection may be employed between the recording trigger 7 and the rocking platen frame 83 in order to actuate the platen. In the present instance I have shown a mechanical connection comprising a pull rod 85 which extends through and into case B and connects with one arm of bell crank 86. The other arm of the bell crank is connected by a link 87 with a projection 88 on the frame 83; the link and its corresponding bell crank arm acting toggle fashion to pull the platen frame and the platen forward toward the count wheels when trigger 7 is actuated by dummy or token can 4. At the same time the platen is given a step by step movement by means of a link 90 and a pawl and ratchet mechanism 91. Tension on the paper and retarding of the rotary movement of the platen roll 24 is effected by the usual spring actuated adjustable rollers 92. The operating mechanism for the platen roller 24 is such that its movement is most rapid at the beginning of a pull on rod 85 finishing with a slow movement and increased leverage as the bell crank arm and link 87 reaches almost dead center; thus giving a heavy pressure on the paper against the type and insuring a perfect imprint.

*Inking the type.*—The type 23 are inked by the typewriter ribbon 82, which latter runs from one roller 95 to a ratcheted roller 96; the latter being operated by a suitable pawl and ratchet mechanism 99, Fig. 9, and link connections 98 with rocking platen frame 83, so that after each imprint the ribbon is given a step forward movement.

*Operation.*—First the machine is cleared so as to set the count wheels at zero by manipulating the lever handle 61 to remove the carrying wheels 47—48 out of contact with the pins 45 and simultaneously to interpose the stop pawls 55 in the path of the single pins 46; it being remembered that there are twenty of the pins 45 on one side of each count wheel all facing in one direction, and a single pin 46 on the opposite side of each count wheel. This operation of the lever 61 brings the key stem 67 into alinement with the key hole 68 in case B to allow a key 69 to be inserted for the purpose of turning the brushes 66. These brushes 66 simply slip over the studs or pins 45—46 until the clearing operation is completed, after which the lever 61 is moved back to initial position bringing the parts in readiness to act. Lever 61 is maintained in either of its desired positions by appropriate means as a hinged stop plate 61ª, Figs. 8 and 7. Next the dials 26—27—28, or indicators 34—35—36, according to the style of the machine, are manipulated to indicate the nature of the run of goods. Taking the style of machine shown in Figs. 18—19, if the machine is to record a run of canned fruit of 2½ lb. cans, dial 28 is turned to bring the notation "2½" opposite pointer 30. This correspondingly causes the can marking wheel 19 to present its type face "2½" opposite the platen roller 24. The other two dials 26—27 are similarly turned to indicate the character and quality or brand of fruit, here represented by the characters "G" and "I". This setting of the machine similarly sets the can marking wheels 20—21 with their type face "G" and "I" alined with the type face "2½" on the wheel 19 and all opposite the platen roller 24. Of course this setting of the can marking wheels may take place at any time prior to the actual passing of the dummy can 4 through the machine. During the run of cans each can as it passes trigger 5 actuates the latter and correspondingly operates through the push rod 70 and ratchet and pawl mechanism 71—72—73 the units count wheel; at each operation throwing the centering cam 79 in between two adjacent pins 45; the carrying forward from one count wheel to another being effected by the carrying wheels 47—48.

At the end of a special run the record is printed on the paper strip 31 by passing the dummy can 4 through the machine; the pin 6 on the latter striking trigger 7, pulling the rod 85 and bringing the platen roll paper forward into printing contact with the alined type face on the several count wheels and marking wheels with the interposed inking ribbon 82. This dummy can 4 is so constructed that it will not actuate the counting mechanism as it is not desired to count the dummy can. It is for that reason that the groove 8 is provided in the dummy can to allow it to clear the counting trigger 5.

In machines where cans of different sizes are run from time to time I may employ a style of dummy can shown in Fig. 6, wherein the slot 8′ is made adjustable by means of the removable rings 4′. Pin 6′ in Fig. 6 and pin 6 in Fig. 5 are each spring mounted so as to be pushed down into the body of the dummy when passing under the heading or sealing mechanisms of the sealing machine. I have not shown pin 6 in the perspective view of Fig. 5 as being spring seated but it is understood that its mounting is the same as that shown in Fig. 6.

The final results of the machine are shown by the printed record illustrated in Fig. 1; the entire recording mechanism being covered by a case is rendered incapable of being tampered with by any unauthorized person. An operator or employee from the office or accounting department of a canning institution may insert blank paper in the machine daily, or as often as reports may be required, and may in turn remove these reports, placing in new blanks, thus leaving all the details of making up the report to the machine.

Having thus described my invention what I claim and desire to secure by Letters Patent is—

1. In a can recording mechanism, a series of count wheels denominationally arranged in train, said count wheels having each a single projection on one side and a plurality of projections on the other side to the number of a multiple of ten, and a series of adjustable two-part carrying wheels coöperating with the count wheels, one part of said carrying wheel being engaged by the single projection, and the other part by a plurality of projections.

2. In a can recording mechanism, a carrying wheel for a counting mechanism made in two-parts with the line of division between the two parts lying in a plane at right angles to the axis of the wheel, said parts being correspondingly notched and each part adjustable circumferentially with respect to the other part to vary the pitch of the notches, in combination with count wheels on each side thereof having pins fitting said notches, the parts of said carrying wheels being engaged respectively by the pins on the count wheels lying adjacent to said parts.

3. In a can recording mechanism, the combination with a bank of count wheels having carrying pins, and adjustable two-part carrying wheels having adjustable notches engageable with the pins, the parts of said carrying wheels being engageable with pins of different count wheels.

4. In a can recording mechanism, a carrying wheel for a counting mechanism made in two parts with a line of division between the two parts lying in a plane at right angles to the axis of the wheel, said parts being notched and each part adjustable with respect to the other to vary the pitch of the notches, in combination with count wheels and pins fitting said notches, said pins being individually engageable with the adjacent part only of the carrying wheel.

5. In a recording mechanism in combination, a bank of count wheels having carrying pins, and carrying wheels formed of two symmetrical adjustable parts having notches engageable with said pins, each of said parts being engaged by the pins of different count wheels.

6. In a recording mechanism in combination, a bank of count wheels having carrying means, carrying wheels formed of two symmetrical parts having notches engageable with said means, each of said parts being engaged by the means on different count wheels, means for adjusting said parts, and means for locking said parts in adjusted position.

7. In a recording mechanism, count wheels a carry wheel having a plurality of symmetrical parts, the parts lying in planes at right angles to the axis and being correspondingly notched, and each part engaging with a different count wheel and adjustable circumferentially with respect to another part to vary the pitch of the notches.

8. In a recording mechanism, count wheels a carry wheel having a plurality of symmetrical parts, the parts being correspondingly notched, and each part engaging with a different count wheel and adjustable circumferentially with respect to another part to vary the pitch of the notches.

9. In a recording mechanism, a series of count wheels denominationally arranged in train, said count wheels having a single projection on one side, and a plurality of projections on the other side, a series of adjustable two-part carrying wheels coöperating with the count wheels, one part of said carrying wheel being engaged by the single projection, and the other part by a plurality of projections.

10. In a recording mechanism, a series of count wheels denominationally arranged in train, said count wheels having a single projection on one side, and a plurality of projections on the other side, a series of two-part carrying wheels coöperating with the count wheels, one part of said carrying wheel being engaged by the single projection, and the other part by a plurality of projections, the parts of said carrying wheels being relatively adjustable to vary the amount and time of movement of one of the count wheels with respect to the adjacent count wheels.

11. In a recording mechanism, a plurality of count wheels of different orders, and a carrying wheel having relatively adjustable parts, one of said parts being in operative engagement with a count wheel of lower order, and another of said parts being in operative engagement with a count wheel of higher order.

In testimony whereof I have hereunto set my hand in the presence of two subscribing witnesses.

HARVEY P. WELLMAN.

Witnesses:
JOHN H. HERRING,
W. W. HEALEY.

Copies of this patent may be obtained for five cents each, by addressing the "Commissioner of Patents, Washington, D. C."